United States Patent [19]
Micali

[11] Patent Number: 5,812,670
[45] Date of Patent: Sep. 22, 1998

[54] TRACEABLE ANONYMOUS TRANSACTIONS

[76] Inventor: Silvio Micali, 459 Chestnut Hill Ave., Brookline, Mass. 02146

[21] Appl. No.: 608,134

[22] Filed: Feb. 28, 1996

[51] Int. Cl.$^6$ ................................. H04L 9/00; H04L 9/30
[52] U.S. Cl. ................................. 380/25; 380/23; 380/24; 380/30; 380/49
[58] Field of Search ................................. 380/9, 23, 25, 380/29, 30, 49, 24, 50, 59

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,438,824 | 3/1984 | Mueller-Schloer . |
| 4,458,109 | 7/1984 | Mueller-Schloer . |
| 4,789,928 | 12/1988 | Fujisaki . |
| 4,885,777 | 12/1989 | Takaragi et al. ........................... 380/30 |
| 4,953,209 | 8/1990 | Ryder, Sr. et al. ........................ 380/23 |
| 5,117,358 | 5/1992 | Winkler . |
| 5,202,977 | 4/1993 | Pasetes, Jr. et al. ..................... 395/500 |
| 5,214,700 | 5/1993 | Pinkas et al. ............................. 380/25 |
| 5,220,501 | 6/1993 | Lawlor et al. ........................... 364/408 |
| 5,243,515 | 9/1993 | Lee . |
| 5,276,737 | 1/1994 | Micali . |
| 5,315,658 | 5/1994 | Micali . |
| 5,436,972 | 7/1995 | Fischer ....................................... 380/25 |
| 5,440,634 | 8/1995 | Jones et al. ................................ 380/24 |
| 5,453,601 | 9/1995 | Rosen ....................................... 235/379 |
| 5,455,407 | 10/1995 | Rosen ....................................... 235/380 |
| 5,497,421 | 3/1996 | Kaufman et al. ........................ 380/23 |
| 5,509,071 | 4/1996 | Petrie, Jr. et al. ........................... 380/4 |
| 5,519,778 | 5/1996 | Leighton et al. .......................... 380/30 |
| 5,521,980 | 5/1996 | Brands ..................................... 380/30 |
| 5,553,145 | 9/1996 | Micali ...................................... 380/30 |
| 5,604,805 | 2/1997 | Brands ..................................... 380/30 |
| 5,606,617 | 2/1997 | Brands ..................................... 380/30 |
| 5,610,982 | 3/1997 | Micali ...................................... 380/30 |
| 5,631,961 | 5/1997 | Mills et al. ............................ 380/23 X |
| 5,647,000 | 7/1997 | Leighton ................................... 380/30 |
| 5,712,913 | 1/1998 | Chaum .................................. 380/30 X |

OTHER PUBLICATIONS

Needham et al, "Using Encryption for Authentication in Large Networks of Computers", *Communications of the ACM*, vol. 21, No. 12, Dec. 1978, pp. 993–999.

Chor et al., "Verifiable Secret Sharing and Achieving Simultaneity in the Presence of Faults", Extended Abstract, *IEEE*, 1985, pp. 383–395.

Even, S., "Secure Off–Line Electronic Fund Transfer Between Nontrusting Parties", Abstract, Jan. 31, 1988, 10 pps.

Shamir, A., "How to Share a Secret", *Communications of the ACM*, vol. 22, No. 11, Nov. 1979, pp. 612–613.

Chaum, D., "Untraceable Electronic Mail, Return Addresses, and Digital Pseudonyms", *Communications of the ACM*, vol. 24, No. 2, Feb. 1981, pp. 84–88.

Desmedt et al., "Threshold cryptosystems", *EE & CS Department, University of Wisconsin–Milwaukee*.

Rabin, M., "How to Exchange Secrets", May 20, 1981, pp. 1–21.

Kolata, G., "Cryptographers Gather to Discuss Research–Analyses of how to break codes and new ways to use codes were featured at the meeting", *Science*, vol. 214, Nov. 6, 1981, pp. –646–647.

(List continued on next page.)

*Primary Examiner*—Bernarr E. Gregory
*Attorney, Agent, or Firm*—Foley, Hoag & Eliot LLP

[57] ABSTRACT

Encryption is a common tool to achieve privacy of communication in networks whose lines are not physically protected. In most communication networks, however, having a sender S send an encrypted message to a recipient R does not hide the very fact that S has sent a message to R, and this may in itself constitute valuable information that the parties would rather keep confidential. A transmission method is described that (1) keeps the identities of senders and receivers confidential, but (2) can trace senders and receivers under certain given circumstances.

76 Claims, 1 Drawing Sheet

OTHER PUBLICATIONS

Blum, M., "How to Exchange (Secret) Keys", *ACM Transactions on Computer Systems*, vol. 1, No. 2, May 1983, pp. 175–193.

Luby et al., "How to Simultaneously Exchange a Secret Bit by Flipping a Symmetrically–Biased Coin", *IEEE*, 1983, pp. 11–21.

Even et al., "A Randomized Protocol for Signing Contracts", *Communications of the ACM*, vo. 28, No. 6, Jun. 1985, pp. 637–647.

Goldreich et al., "How to Play Any Mental Game or a Completeness Theorem for Protocols with Honest Majority", *Proceedings of the 27th Annual IEEE ACM Symposium on Theory of Computing*, May 1987, pp. 218–229.

Goldwasser et al., "The Knowledge Complexity of Interactive Proof Systems", *Siam Journal of Computing*, vol. 18, No. 1, Feb. 1989, pp. 186–208.

Damgard, I., "Payment Systems and Credential Mechanisms with Provable Security Against Abuse by Individuals", Extended Abstract, pp. 328–335, Proceedings of Crypto '88.

Chaum et al., "Untraceable Electronic Cash", Extended Abstract, pp. 319–327, Proceedings of Crypto '88.

Dolev et al., "Non–Malleable Cryptography", Extended Abstract, *Communications of the ACM*, Mar. 1991, pp. 542–552.

Batelaan et al., "Internet Billing Service Design and Prototype Implementation", Carnegie Mellon University Information Networking Institute 1992 Final Project, Mar. 30, 1993, 16 pps.

Bürk et al., "Digital Payment Systems Enabling Security and Unobservability", *Computers & Security*, vol. 8, 1989, pp. 399–416.

Rabin, M., "Transaction Protection by Beacons", Harvard University, Cambridge, MA, Nov. 1981, 21 pps.

Ben–Or et al., "A Fair Protocol for Signing Contracts", *IEEE Transactions On Information Theory*, vol. 36, No. 1, Jan. 1990, pp. 40–46.

Rivest, et al., "A Method for Obtaining Digital Signatures and Public—Key Cryptosystems," *Communications of the ACM*, Feb. 1978, pp. 120–126.

Goldreich et al., "Proofs That Yield Nothing But Their Validity or All Languages in NP Have Zero–Knowledge Proof Systems", *Journal of the Association for Computing Machinery*, vol. 38, No. 1, Jul. 1991, pp. 691–729.

Low, Steven H., "Anonymous Credit Cards," Proceedings of the 2nd ACM Cocnference on Computer and Communication Security, Fairfax, Virginia, Nov. 2–4, 1994, pp. 1–10.

Sirbu, Marvin, "NetBill: An Internet Commerce system Opitmized for Network Delivered Services," Carnegie Mellon University, Pittsburgh, Pennsylvania.

Bellare, Mihir, "iKP—A Family of Secure Electronic Payment Protocols" (Extended Abstract), Jul. 12, 1995, pp. 1–21.

Pedersen, Torben P., "Electronic Payments of Small Amounts," Computer Science Department, Aarhus University.

Chaum, David, "Security without Identification: Transaction Systems to Make Big Brother Obsolete," Communications of the ACM, Oct. 1985, vol. 28 at 1032–1033.

Dukach, Semyon, "SNPP: A Simple Network Payment Protocol," MIT Laboratory for Computer Science.

Cheng, Pau–Chen, "Design and Implementation of Modular Key Management Protocol and IP Secure Tunnel on AIX," IBM Thomas J. Watson Research Center, Apr. 28, 1995.

Janson, P., "Electronic Payment Over Open Networks," IBM Zurich Research Laboratory, Apr. 18, 1995.

Hickman, Kipp E.B., "Standards Documentation: The SSL Protocol," Netscape Communications Corporation, Jun. 1995.

Rescorla, E., "The Secure HyperText Transfer Protocol," Enterprise Integration Technologies, Jul. 1995.

Neuman, Clifford B., "Requirements for Network Payment: The NetCheque™ Perspective," Proceedings of the IEEE Compcon '95, San Francisco, Mar. 1995.

Stein, Lee H., "The Green Commerce Model," Stein, Stefferud, Borenstein, Rose, Oct. 1994, pp. 1–18.

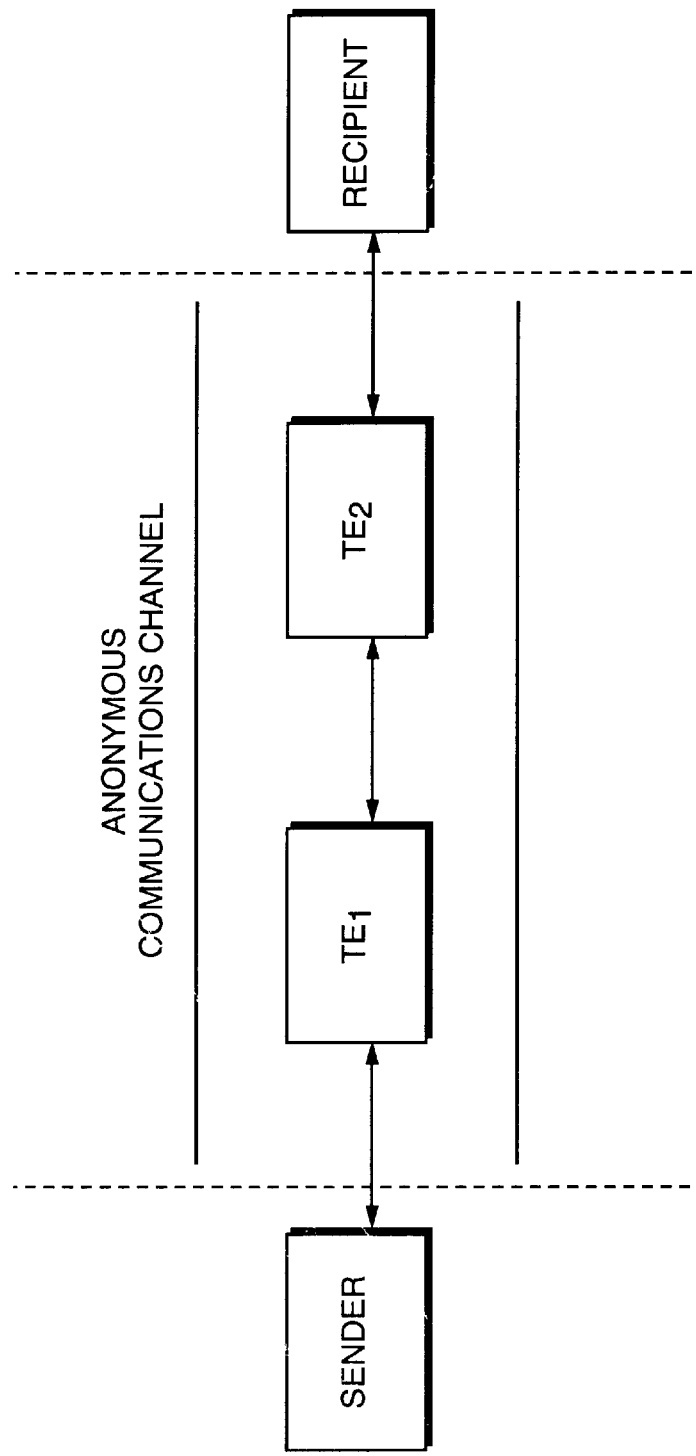

TRACEABLE ANONYMOUS TRANSACTIONS

CROSS-REFERENCE TO RELATED APPLICATION

The present application is related to and claims priority on prior copending Provisional Application No. 60/009,334, filed Dec. 28, 1995 and titled "Traceable Anonymous Transactions."

TECHNICAL FIELD

The present invention relates generally to secure transactions and, more particularly, to techniques for anonymous, yet traceable, transmission and reception of messages.

BACKGROUND OF THE INVENTION

A known protocol of Chaum (Communications of the ACM, February 1981, Volume 24 at 84–88) describes untraceable electronic mail wherein electronic messages are delivered to recipients but the identity of the sender is kept anonymous. Anonymity can be sought with respect to different parties. For instance, when employers elicit "truthful" opinions from their employees, senders may desire not to be identified by their recipients. In some other cases, a sender and a recipient may even know each other's identity (e.g., they may actually exchange signed messages), but wish that other parties are incapable of learning that they are the sender and the receiver of a given message or sequence of messages. For instance, because they want to hide the existence of a business negotiation between them, anonymity is an important privacy enhancement of any mail system, and can be very valuable to the smooth flow of business and other human interactions.

Untraceability, however, is not always desirable. For instance, an anonymous electronic mail system may be misused with impunity for sending threats to the users of a computer network. As another example, in a communication network that guarantees the untraceability of senders, the distribution of illegal material may thrive essentially unchecked. For instance, there is a growing concern that the Internet may be misused for the improper distribution of pornography (e.g., to minors). The speed and convenience of computer networks could also be very attractive for sending inside-trading information or any other kind of illegitimate information. Such networks already provide encryption facilities, which make it easier to hide illegal data, and the presence of an anonymous mail system may provide yet one more layer of protection for illegal activities. Indeed, even if law enforcement succeeds in obtaining the cleartext of such data (e.g., via the cooperation of its recipient), tracing its sender may still prove quite hard.

Thus, though anonymous mail has its own advantages and legitimate applications, reputable service providers of major communication networks may shy away from offering untraceable services, because of their associated liabilities or because they do not wish to be instrumental to any illegal or improper activity.

BRIEF SUMMARY OF THE INVENTION

It is a primary object of the present invention to describe a communications system wherein messages are sent and received in an anonymous, yet traceable manner.

It is a further object of the invention to describe techniques for implementing various types of anonymous transactions using one or more trustees that have the capability of determining the identity of a sender or a recipient.

It is another object of the invention to facilitate secure communications between an anonymous sender and a recipient wherein a reply to a message is linked to the message and is traceable to it.

It is still another object of the invention to facilitate such secure communications wherein the identity of the original recipient of a message remains anonymous yet the recipient's reply to the message is guaranteed to be traceable to the message.

Another object of the invention is to establish and maintain an anonymous communications channel between an original sender and recipient during a communications session and wherein at least one of the parties does not know the identity of the other party.

A still further object is to provide such an anonymous communications channel with at least one, preferably two, and possibly more trustees forming a direct connection path between the original sender and recipient such that communications travel back and forth through the various parties.

According to yet another object, an anonymous communications channel is maintained between an original sender and recipient, wherein at least one of the parties does not know the identity of the other party, and wherein the identity of either or both parties is traceable under certain circumstances through an "audit" procedure.

In the preferred embodiment, the invention provides so-called Traceable Anonymous Transactions (TAT systems, for short). These are message-transmission systems that

- guarantee sender-recipient anonymity, and, at the same time,
- guarantee that this anonymity be taken away under proper circumstances, i.e., that the message can be traced to the proper sender and/or replies can be traced to the messages that triggered them.

The process of tracing sender and/or receiver information is conveniently referred to as an audit. This invention focuses on the mechanisms necessary for providing "traceable anonymity." Appropriate conditions under which tracing occurs is quite varied, depending on the particular circumstances of the communications being carried out. In a public communication network, the rules that determine whether sender/recipients should be traced preferably will be stricter than in the case of a private network (or in the case in which the facilities of a private provider have been used, at least in part, to deliver the message in an otherwise public network).

Among other applications, TAT systems enable service providers (in networks, such as the Internet) to offer anonymous mail services without incurring the risk, responsibility, and liability of boosting criminal or improper operations. Indeed, even if an anonymous mail system is put in place for the purpose of hiding sender-receiver information with respect to other parties (e.g., like in a business negotiation), the danger exists that it can then be misused (e.g., by senders to harass some recipients).

Anonymous, but traceable, mail systems can also be used for a variety of other applications. Indeed, when submitting a written exam, examiners may wish to remain anonymous to their examiners, until all grades are given, when it may be desired that all senders may be correctly matched with their hand solutions. Here, therefore, is an example in which anonymity and traceability are needed in any single instance, and not just if something improper occurs. In this case, therefore, the proper condition for tracing sender information is just the passage of a given amount of time, or having completed some action (such as the grading).

A similar case may occur during a (possibly electronic) auction, where bidders may wish to remain anonymous until the goods have been adjudicated, in which case all bidders, or just the winners may be traced.

This invention preferably relies on the specific collaboration of one or more trustees; preferably, two collaborating but distinct trustees.

The inventive method preferably splits the specific sender/recipient information of a communication between the trustees, so that no single one of them knows all its details. It would be undesirable for the trustees to share their knowledge in ways other than that indicated by the system, and thus trustees should be chosen with an appropriate degree of trustworthiness in mind. During a proper audit, however, the trustees can (and indeed they should) collaborate so as to trace correctly the sender-receiver information of each audited anonymous transmission.

Preferably, the system should ensure that an audit results in correctly tracing the sender-receiver information of exactly the audited transmission, and preferably not that of other transmissions, even those having the same sender. Indeed, even if only proper audits will elicit collaboration of the trustees and thus succeed in trading the right sender-receiver information, it may still be possible that the prerequisite for auditing a given traceable anonymous transmission has not been correctly met, and thus important that the confidentiality of sender-receiver information of other transmissions be maintained.

Preferably too, the trustees should not be required to store anything about a transmission, or any significant amount of data about it. Indeed, this may be too expensive to do, or it may impose too much responsibility (because, presumably, the trustees should vouch for the integrity of the data stored about each TAT transmission, at least for a reasonable time, and thus store it in very reliable ways). In the preferred embodiment, a trustee just stores a few keys, and still is capable to handle audits.

BRIEF DESCRIPTION OF THE DRAWINGS

For a more complete understanding of the present invention and the advantages thereof, reference should be made to the following Detailed Description taken in connection with the accompanying drawing in which:

FIG. 1 illustrates a traceable anonymous communications channel wherein there is an original sender, an original recipient and a pair of trustees.

DETAILED DESCRIPTION OF THE PREFERRED EMBODIMENT

The original sender and recipient are separated in the simple embodiment by two trustees, as seen in FIG. 1. We shall first describe the preferred embodiment of the TAT systems where considering first how to make traceable the senders of anonymous messages. We shall then describe how to reply in a traceable manner to anonymous messages, how to build anonymous channels, and how to make traceable replies.

Traceable Anonymous Sender

This embodiment preferably comprises three steps (a sender's step, a first-trustee step, and a second-trustee step, plus an audit procedure). In the sender's step, the sender gives the first trustee an encryption, with the first-trustee's key, of her own signature of (1) her identity, possibly encrypted with the first-trustee's key, and (2) an encryption, with the second trustee's key, of (2a) her message encrypted with the recipient's key, and (2b) the address/identity of the recipient.

After the sender step, the first trustee can verify the sender's signature, and the fact that the signed information consists of (1) the identity of the sender, which is understandable to it, and (2) the encryption of the message and the recipient's identity. Because the second portion is not understandable to it, the first trustee does not learn the message nor the recipient's identity. But, whether or not the first trustee learns the sender's identity from the mere fact that it had received a communication from her, it preferably learns the sender's identity in a way that is provable to others (i.e., by means of a digital signature) and is unambiguously tied to the message in question (indeed, the sender preferably signs a combination of her own identity and data identifying her transmission, such as an encryption of her message and of the identity/address of its recipient).

In the first trustee step, if the verification of the data received by the sender is satisfactory, the first trustee gives the second trustee (preferably encrypted with the second trustee's key) its own signature of (1) the received (from the sender) encryption (with the second trustee's key) of (1a) the message (already encrypted with the recipient's key) and (1b) its recipient identity, together with (2) the received (from the sender) encryption (with the first trustee's key) of the signature of the sender.

After the first trustee step, the second trustee verifies the signature of the first trustee and determines the recipient's identity. But the second trustee cannot verify the sender's encrypted signature, nor can it determine the sender's identity, nor can it understand the sender's message. However, the signature of the first trustee signifies that the information received by the second trustee includes an encrypted version of the sender's signature, which was properly verified by the first trustee.

In the second trustee step, the second trustee sends the recipient (preferably encrypted with his key) its own signature of (a) the encrypted (with the recipient's key) message together with (b) an encryption, with its own key, of the received encryption (with the first trustee's key) of the sender's signature, and, preferably, (c) the received signature of the first trustee (possibly encrypted with the second trustee's key).

The result of these three steps is that the recipient does not learn the sender's identity, but receives both the correct message (in a form that is understandable to him), and information that (is not understandable by him but) is guaranteed to be sufficient for tracing the sender in case of a proper audit (which, for instance, he may request based on the message content). In particular, he preferably receives the sender's signature (of the sender's name and her encrypted message) encrypted with the first trustee's key and then further encrypted with the second trustee's key.

In case of a proper audit, the trustees will cooperate by each removing its own encryption layer, thus exposing the sender's signature, which reveals her identity in a certified way. That is, not only her identity will become known (to the recipient or trustees, or to an authority participating in or coordinating the audit), but it will become known (by means of her signature) in a way that is provable to others (e.g., in court). Moreover, we prefer the sender's identity be provably bound to the specific sent message, as it is the case if she signs together information identifying her and the message. Having the sender just sign the message may suffice for the purpose of provably binding the sender to the message. In a typical signature scheme, however, the sender's signature may be easily verified given the sender's public verification key, but a verifier who is just given the sender's signature may be at loss as of which verification key to use.

Indeed, trying all possible verification keys may be quite impractical. (Similar problems may arise for other types of authentication techniques.) Explicitly including the sender's identity avoids these problems. Such identity may however be excluded if the authentication techniques used do not give rise to similar problems. The identity information, however, may be properly associated with the signed message rather than signed together with the message.

Notice also that both trustees must cooperate in an audit for tracing the sender's identity. Indeed, the sender's signature is successively encrypted with both of their keys. Thus, for instance, if no proper audit is in place, and if the first trustee happens not to be trustworthy after all, the recipient cannot, in order to learn the sender's identity, go to the first trustee to have decrypted the encryption of the signature of the sender. In fact, this signature is encrypted with the second trustee's key, and thus the first trustee alone is powerless in understanding it. If desired, however, one can use both trustees for providing anonymous delivery but require that action of only one trustee for an audit. For instance, the second trustee may forward to the recipient the sender's signature encrypted with just a first trustee key (without adding its own encryption layer). In this way, only the first trustee need remove its own encryption layer for divulging the sender's identity. (The encryption of the sender's signature may be the original one sent by the sender to the first trustee or an encryption made by the first trustee itself. Indeed, the sender may send its signature to the first trustee without encrypting it (e.g., because if he believes that the communication line to the first trustee is secure enough)).

Of course, the first trustee can, if malicious, divulge the identity of all senders it deals with independent of whom their encrypted recipients may be. But this is a much less valuable piece of information to a given recipient. Of course, a malicious trustee may prevent the sender from communicating with the recipient all together, but this is a totally different sort of problem.

It should also be appreciated that, the fact that the trustees collaborate during an audit and remove the different encryption layers does not enable a malicious recipient to take advantage of an audit in order to find out the identity of the sender of another transmission. Indeed, if the audit were granted about a given message, the trustees can ensure that their collaboration is restricted to that specific message, and the system ensures that a sender of another transmission cannot be made to appear as the sender of the transmission at hand, so that if that other transmission is audited and the present one is not the sender's identity of the present transmission will remain confidential.

Traceable Anonymous Replies

A TAT system may also keep recipients traceable and anonymous. For instance, senders of some messages addressed to some recipients may be themselves new recipients of the replies to these messages. Indeed, a message M sent by a sender S to a recipient R may consist of a question or a request and R may be expected to send something (i.e., a message M') in response. Thus, S becomes the recipient of this response M', and wishes to keep her anonymity. This could be accomplished by having the sender send, together with her original message M, an encryption key k and her own return address encrypted with the key of the second trustee. Thus R may use the latter ciphertext as item (2b) of a sender step in which he is the sender, M' the message, and the message is encrypted with key k. Since the return address of S is part of what she sends R in the original sender's step, and since our system allows the traceability of the sender, and the association with the sender of whatever she sends (and thus S's return address in particular), recipient S is still traceable if so wanted and, of course, the new sender R is also traceable. We may, however, easily modify the system so that only senders are traceable, and not recipient, or vice versa.

As we have just seen, ignoring traceability issues, recipient R's reply may be sent back to the original sender S by means of a new sender step (which utilizes information previously sent by S to R). Thus, in the preferred embodiment (in which there are two trustees), in the original sender step S transmits information to the first trustee, this one to the second, and the second to R. During a reply, R transmits information to the first trustee, this to the second, and the second to S.

Preferably, however, we suggest that replies are routed in a different manner; namely, by routing the reply to a message backwards through the same communication path used to deliver the message, i.e., by having R transmit information to the second trustee, who transmits back to the first trustee, who transmits back to S.

For example, and without limitation intended, in a computer network this can be accomplished by having both the first trustee and the second trustee remaining in a waiting mode and hold the connection until the reply comes back. Thus, when R sends its reply to S, this reply can travel backwards the same path traveled by S's message and, preferably, using the same connections. (If so wanted, at each leg of this path a proper identifier may be added, preferably in a secure or authenticated way, so as to be certain to which message does each reply correspond).

Notice that keeping the trustee in a waiting mode with a temporarily open path of communication is quite natural if R is a service provider which S wishes to "browse" anonymously, or from which S wishes to obtain a specific service in an anonymous manner. Indeed, such an R is geared for prompt response, at least signaling that it is unable to provide the requested service.

In this application, anonymous reply by means of such "backward traveling" may be preferable for a variety of reasons. First, backward traveling may simplify billing. Indeed, the first trustee may easily bill S for handling her anonymous message M to R, but R's reply M' should be billed to S too, because R sent it at S's request. Now, if S sent M to R along a communication path (from S to the first trustee, to the second trustee, to R) that is kept open and traversed backwards when R replies to S by sending M', it is easy to trace replies to particular messages. By "tracing" it is not required that the trustee or some other external entity understand the content of the message or the reply and have an absolute proof that one reply was sent to a particular message. Even without proof, a trustee who "sees" messages going in one direction and replies in the other is guaranteed that these communications relate to each other. Thus, even though these messages and replies may not be understood by the trustees, and at least one of S and R may not be known, it is easy even for the trustees to keep track of how much time an anonymous communication session between S and R (whomever they may be) has taken. (This is useful because R or the trustees may bill on a time basis). Alternatively, it is easy even for the trustees to keep track of how many bits have been transmitted in an anonymous communication session (indeed, billing may occur on a per-byte basis or in some other predetermined manner). Alternatively, it is easy even for the trustees to keep track of the mere fact that certain replies are traceable to certain messages (indeed, each reply may have its own price) and thus may be billed directly or indirectly to the senders of those messages. Second, establishing a communication path that is used back and forth may simplify other aspects, such as allowing S and R to communicate their messages back and forth more than one time using the same encryption key (that thus becomes a de facto session key), reducing "hand shakes," etc.

Backward traveling, however, may still be advantageously approximated by establishing session anonymous paths from S to R and from R to S. Indeed, these paths may not be identical, but the same path is used for having S send sender-anonymous messages to R, and for R to send recipient-anonymous replies to S. Although a multiplicity of trustees may be available, and although each path may involve a different set of trustees, each path passes through the same trustees in the same order each time it is used during an anonymous communication session. This allows S (respectively, R) to use the same key for encrypting messages to R (respectively, S) if so wanted; and guarantees that if message M is sent before message m, and it is not lost, then M will arrive before m. Proper identifiers may be used to ensure that messages belonging to the same anonymous conversation session between the same S and R travel along the same path. Establishing and using such fixed anonymous paths will be beneficial for being able to provide anonymous services.

Anonymous messages, however, can be traced or "linked" to their replies without using anonymous channels and backward traveling, or anonymous session paths. For instance, a sender may label her initial message to R also by some string x (e.g., randomly selected), R may label his reply to this message also by a string y that is dependent of x by means of some linking function: f (e.g., f may be the identity function, in which case, all messages concerning the same session may include the same label x, or the function that increments by 1, in which case the reply may include y=x +1). The sender's further message to R (within the same session) may be labeled f(y), and so on. In essence, function f signals a linkage between messages belonging to the same anonymous session (indeed, it may be the function f that indicates which messages belong to a given session).

The trustees can be made aware (in the clear) of such labels without necessarily divulging the messages to them. Thus, if a trustee helps to deliver an encrypted message M labeled "x" and then sees another communication labeled f(x), the trustee can trace one communication to the other without necessarily knowing what these encrypted messages/replies mean.

A linking function f may take additional inputs such as the time at which a message is sent, or the length of a message, or both. Alternatively, f may keep track of the TOTAL time or message-length of an anonymous session. For instance, if S initiates a session with a service provider R by sending an anonymous message M of length L (e.g., consisting of L bits or bytes), then she sends M with a label that reflects the value L. When replying to S with a message M' whose length is L', R may send M' with a label that reflects that the total current message-length of the session is L+L'. S's further message of length L" to R, if any, can be labeled in a way that reflects the total running value of L+L'+L", etc. Though S and R may communicate via distinct anonymous session paths (or in some other way), one can have a good control of the total length of an anonymous session. In fact, each of S and R may control that each running total is correct, and take proper action (e.g., stopping the session) if it is not. This control may be extended also to the trustees if so wanted, without compromising the anonymity of the system. For instance, if S always uses the first trustee for sending her anonymous messages to R (which certainly is the case if anonymous channels or session paths are used), then she can make the indication of the running total length understandable by the first trustee, and nothing else may be divulged to this trustee. Thus, while preserving all essential aspects of an anonymous system, the first trustee will always be informed of the total length (as agreed by S, in absence of any proper action by her) of an anonymous session. A similar effect can be achieved with respect to time or transmission time rather than length. Among other uses, linking functions may be quite effective for billing purposes.

A linking function may also be tightly coupled to the content of the anonymous messages exchanged. For instance, the label of a message may contain an indication of a (preferably one-way) hashing of the message and or prior messages. One may also have running total of such hashings, for instance, but without limitation, if the (preferably one-way) hashing of the messages sent so far is T, then the current message M can have a label that reflects the value T'=H(T|M), that is, H evaluated on the concatenation of T and M.

A linking function may also just link a message M with its immediate reply M', even without an anonymous channel or anonymous session paths.

Variants

Many variants and additions are also possible and envisioned by this invention.

Trustees may be "distinct arms" of the same organization, or totally separate entities. (Indeed, they need not share any special information that would be available only within a single company.) If each trustee were individually trusted to keep its own data confidential, the possibility that both trustees improperly collude should be quite remote. On the other hand, trustees are trusted to collaborate, in case of an audit, so as to identify sender-or receiver-information.

To realize a TAT system, as noted above one needs not have "direct" communication lines between each pair of parties. (Indeed, a TAT system may be realized within a broadcasting network, where no direct lines may actually exist between users.) For instance, in the case of a TAT system realized within a computer network, the sender may transmit her required data to the first entity via some sequence of direct communication lines rather than via a single direct communication line. In this case, we may distinguish between the (true) sender and receiver of a TAT, and the immediate sender and immediate receiver at the opposite ends of a direct communication line. Indeed, it is desired to build TAT systems that guarantee traceable anonymity, even if realized within a network of direct lines where each immediate receiver of a message knows the identity of its immediate sender. Indeed, for the true recipient, learning the identity of the true sender and that of the immediate sender are two very different things. Further, it is desired to guarantee the anonymity of an honest sender in networks where an adversary may monitor all direct communication links, and is thus capable of learning the time length, immediate origin, and immediate destination of each transmission (and even the actual content of each transmission, if encryption is not used).

It is thus desirable to boost the untraceability of the TAT system with respect to adversaries capable of such sophisticated traffic analysis. Generally, unlike in a traditional communication network, a message traveling to its destination in a TAT system is not prefixed with publicly accessible sender-receiver information. Rather, the message's journey is preferably broken into three conceptual legs: the first from the sender to the first entity, the second from the first entity to the second, and the third from the second entity to the intended recipient. Thus, whether or not in each leg an "immediate-sender-receiver" prefix is used, each individual header does not reveal the "full story;" that is, it does not link the true sender to the true recipient. Indeed, if used, the header information of a leg need not specify in a publicly-understandable way the address information of the next leg.

Nonetheless, a determined and resourceful adversary may still infer from time and length-information relative to a message traveling in a TAT system who is its original sender and who is its final recipient. To this end, in many communication networks, it is preferable that the two entities (possibly in cooperation with the users) also implement a Traffic Decoupling Phase, TDP for short, in order to defeat or reduce considerably such traffic analysis.

The inventive TAT system works with any TDP, and does not depend on its details. Various ways to implement a TDP have been discussed in the literature, and all of them or new ones can be used herein. For instance, for traffic-decoupling purposes, the two entities may not forward their received messages right away; rather, they may wait to have received a given number of messages and then forward them all together, or sequentially, but in some permuted order. For instance, assume a TAT system has one million users, and one thousand of them actually send a message every hour. Then, if the two entities wait (without limitation) up to an hour before sending received messages, an enemy who observes their message traffic faces the task of matching some one thousand messages received by the first trustee to some one thousand messages sent by said trustee, or, ultimately, by the second trustee. Thus, even if he knows all senders and all receivers relative to that hour, he will still be quite uncertain as of which matching is right. Indeed, also message-length information can be hidden or sufficiently masked. For instance, one may use a standard length (e.g., by padding short messages with O's), or break longer messages into two or more standard ones.

It can be appreciated that, though the above TAT system works more smoothly with public-key encryption systems, such as the RSA, it also works with conventional cryptosystems as well. One may actually use a mixture of public- and private-key encryption. The encryption technique itself can be deterministic or, preferrably, probabilistic (that is a message is encrypted with the help of a random string).

Digital signatures are preferred so that one obtains an easy proof that the sender takes responsibility for her message. Notice that this assumption of responsibility holds whether the sender signs the message in the clear or an encryption C of the message (provided that C can be decrypted in a single manner -or, at least, that one cannot find two different decryptions for C). The scheme can be made more efficient if messages are one-way hashed prior to signing them. Indeed, one may make one-way hashing integral part of signing.

Notice too, that the reference to a "digital signature" should be construed to encompass any other type of digital authentication, or any other combination of traditional and digital authentication. It may also refer to the situation where the message comes from an at least temporarily-dedicated or previously-authenticated line, such that the communication is thus self-authenticating. Any such modification is in the scope of the invention.

Notice that the preferred embodiment the sender encrypts the message with the recipient's key so as to keep it private, in particular, from the trustees themselves. However, the sender may not wish to keep such privacy from the trustees (e.g., because they may comprise or consist of secure hardware) and may not worry about traffic analysis. In this case, the message may be sent in the clear (i.e., not encrypted in the recipient key, may be encrypted with a trustee's key, or may be encrypted by the trustees for transmission to each other or to the recipient.

Although two trustees are recommended, it should be appreciated that more trustees can be used if so wanted, though this may slow down the performance of the system. If so wanted, one may even use a single trustee, but this single trustee may be able to match a sender with her recipient (though it can be prevented from understanding the sender's message and can keep the sender's identity hidden from the recipient, as long as certain special conditions do not apply). Actually, if one wishes to implement a single-trustee TAT system, then it would be quite advantageous (but not necessarily required) that this trustee comprises some secure hardware; that is, a physically-protected devices (e.g., a chip) that prevents tampering with or reading with its content. In fact, such a secure piece of equipment cannot deviate from its prescribed instructions and make it easy to divulge -say- the sender's identity. At the same time, such a trustee may, when receiving a special type of signal (which can be issued only during a proper audit) cooperate in tracing the sender and in taking other possible actions.

It should be appreciated that the system does not require the trustees (or trustee) to keep in storage much information about the individual traceable anonymous message it helps transmitting. For instance, a trustee need not store away the encrypted messages it forward so as to be able to trace their senders if the proper envisaged conditions apply. Rather, a trustee preferably keeps only its secret decryption and/or signature keys, and thus a quantity that is small and independent of the various messages. A trustee preferably forwards with the (encrypted) message other (encrypted with its own key) tracing information that can be used in case of an audit. The audit is preferably requested by the recipient. If he does not wish to initiate to request such a procedure, he can disregard the received tracing (but unintelligible to him) information. Thus, no wasteful storage occurs in the preferred embodiment, which makes the TAT system very convenient and economical. We may, however, with the scope of the invention, have one or more of the trustees keep some information in storage for some messages sent, at least for a certain amount of time. In this case, the step of sending information to the recipient may be omitted.

It should be also noted that, for maximum security and clarity of exposition, we make an extensive use of encryption and digital signatures. We may however, reduce the use of such tools while still achieving an acceptable level of security. For instance, we may skip encrypting certain messages in the key of their immediate recipients, or sign and/or authenticate only some part of the data and/or a compressed version of the data. In particular, we may have some but not all the trustees sign information about the sender, and we may arrange so that the cooperation of some and not all trustees is required during an audit.

In the present invention, the terms "sender" and "recipient" should be broadly construed to include persons and other entities, as well as devices, computers, systems, apparatus and combinations thereof. Thus, for example, a recipient may comprise a database and the message may be a request to access data therein. In such a case, a "communications session" may be querying of a database and receiving the requested data in response. Of course, the above is merely exemplary and there is no requirement that the present invention be implemented in any particular application or operating environment.

What is claimed is:

1. A method of communication between a sender and a recipient with the assistance of at least one trustee, wherein the recipient does not know the identity of the sender, comprising:

having the sender send to a trustee a digital signature of information identifying the sender and a message encrypted with an encryption key of the recipient;

having a trustee send the recipient the message encrypted with the recipient key and the sender's signature encrypted with at least a trustee's encryption key; and under predetermined circumstances, having a least a trustee take action to identify the sender.

2. The method as described in claim 1, wherein there is exactly one trustee, and the trustee makes use of secure hardware.

3. The method as described in claim 1, wherein there are at least two trustees further comprising:

having a trustee receiving data from the sender send data to another trustee; and having the trustee that receives data from the sender be different from the trustee that sends the encrypted message to the recipient.

4. The method as described in claim 3, where at least one trustee must take action to identify the sender.

5. The methods as described in claims 1, 2, 3 or 4, wherein the identity of the sender is provably bound to the message.

6. The method as described in claim 5, wherein if the predetermined circumstances occur about a given message, then the sender of that message is identified while keeping secret the identity of the same sender with respect to at least some other messages.

7. An electronic communications method between a sender and a recipient with the assistance of at least first and second trustees, wherein at least one of the sender and recipient does not know the identity of the other party, by:

establishing and maintaining an anonymous communications channel between the sender and the recipient during a communications session in which sender and recipient exchange messages and replies, wherein information is provided to the recipient that is guaranteed to be sufficient to trace the identity of the sender with assistance from at least one trustee and yet does not reveal the sender's identity to the recipient without such assistance.

8. The method as described in claim 7 wherein at least one trustee does not understand the messages and replies exchanged by sender and recipient.

9. The method as described in claim 7 or 8 wherein the trustees hold information that is guaranteed to identify the sender.

10. The method as described in claim 9 wherein the trustees do not provide such information to the recipient.

11. The method as described in claim 7 wherein the first and second trustees provide assistance to determine the identity of the sender under predetermined circumstances.

12. The method as described in claim 7 wherein the anonymous communications channel includes a communications path between the sender and a trustee and a communications path between said trustee and the recipient.

13. The method as described in claim 12 wherein the reply is transmitted backwards from the recipient to the trustee, and from said trustee to the sender.

14. The method as described in claim 7 wherein at least part of the anonymous communications channel makes use of broadcasting.

15. A method of enabling a sender to provide a message to a recipient with the assistance of at least a first trustee, wherein the recipient does not know the identity of the sender, comprising:

having the sender and the at least the first trustee participate in a communications protocol by which information is provided to the recipient, wherein the information includes the message and data that is sufficient to trace the identity of the sender yet does not reveal the sender's identity to the recipient; and having the recipient take action to determine the message.

16. The method as described in claim 15 wherein at least first and second trustees are used, and further comprising having the first and second trustees assist in determining the identity of the sender.

17. The method as described in claim 16 wherein at least one of the sender, the recipient and the first and second trustees communicate electronically over a communications channel.

18. The method as described in claim 17 wherein the communications channel is a computer network.

19. The method as described in claim 17 wherein at least some of the communications occur by broadcasting.

20. The method as described in claim 16 wherein the first and second trustees are separate entities.

21. The method as described in claim 16 wherein the first and second trustees are parts of a single organization.

22. The method as described in claim 15 further comprising having the recipient provide the sender with a reply to the message.

23. The method as described in claim 22 wherein the reply is guaranteed to be traceable to the message by at least one trustee.

24. The method as described in claim 23 wherein the reply cannot be understood by the at least one trustee.

25. The method as described in claim 15 wherein at least a trustee comprises a secure hardware device.

26. A method of communication between a sender and a recipient with the assistance of at least first and second trustees, wherein the recipient does not know the identity of the sender and each trustee has a key, comprising:

having the sender send the first trustee a digital signature of a string identifying the sender and a message encrypted with a recipient key and an address of the recipient;

having the first trustee send the second trustee an encryption with its own key of the digital signature, the encrypted message and the encrypted recipient's address;

having the second trustee send the recipient the encrypted message and information that is sufficient to trace the identity of the sender yet does not reveal the sender's identity.

27. The method as described in claim 26 further comprising:

having the recipient take action to determine the message.

28. The method as described in claim 27 further comprising having the recipient provide the sender with a reply to the message.

29. The method as described in claim 28 wherein the information sent by the second trustee to the recipient includes an encryption key and a return address encrypted with the key of a trustee to facilitate the reply.

30. The method as described in claim 28 wherein the reply is guaranteed to be traceable to the message and is delivered from the recipient to the second trustee, from the second trustee to the first trustee, and from the first trustee to the sender.

31. The method as described in claim 28 wherein the reply is guaranteed to be traceable to the message and is delivered from the recipient to the first trustee, from the first trustee to the second trustee, and from the second trustee to the sender.

32. The method as described in claim 27 further comprising:
having at least one trustee take action to identify the sender.

33. The method as described in claim 26 further comprising having at least one trustee take action under given circumstances to determine the identity of the sender.

34. The method as described in claim 33 wherein at least one trustee takes action by removing its own encryption layer from a ciphertext encrypting information identifying the sender.

35. The method as described in claim 34 wherein the sender's digital signature reveals the sender's identity in a way that is provable to other parties.

36. The method as described in claim 26 wherein at least one of the sender, the recipient and the first and second trustees communicate electronically over a communications channel.

37. The method as described in claim 36 wherein the communications channel is a computer network.

38. A method of communication between a sender and a recipient with the assistance of at least first and second trustees, wherein the recipient does not know the identity of the sender and each trustee has a key, comprising:
having the sender send the first trustee a digital signature of a string identifying the sender and an encryption, with the second trustee key, of a message intended for the recipient and an address of the recipient;
having the first trustee send the second trustee an encryption with its own key of the sender's digital signature and the encryption of the message and the recipient's address;
having the second trustee send the recipient the message and information that is sufficient to trace the identity of the sender yet does not reveal the sender's identity.

39. The method as described in claim 38 wherein message of the sender also includes a return address encrypted with a trustee key to facilitate a reply to the message.

40. The method as described in claim 1, 7, 15, 16 or 38 wherein the sender is a bidder and the recipient is an auctioneer.

41. A method of enabling a sender to provide a message to a recipient and the recipient to provide a reply, with the assistance of at least a first trustee, wherein the recipient does not know the identity of the sender, comprising:
having the sender and the at least first trustee participate in a communications protocol by which a first transmission label is provided to the first trustee and information is provided to the recipient, wherein the information includes the message and data that is sufficient to trace the identity of the sender yet does not reveal the sender's identity to the recipient; and
having the recipient take action to reply to the message by which a second transmission label is provided to the first trustee and a reply is provided to the sender;
wherein the second transmission label is obtained by applying a given linking function to the first transmission label.

42. The method as described in claim 41 wherein the first and second transmission labels are used to facilitate billing.

43. A method of communicating a message between a first party and a second party with the assistance of at least one trustee, comprising:
sending the message from a first party to the second party with the assistance of at least one trustee, wherein the second party does not know the content of the message or the identity of the first party and the trustee contributes action to trace the first party's identity under a predetermined circumstance.

44. The method as described in claim 43 wherein the message is communicated with the assistance of first and second trustees, and wherein the first and second trustees collaborate to trace the first party's identity under the predetermined circumstance.

45. The method as described in claim 41 wherein the first and second trustees are part of the same organization.

46. The method as described in claim 43 wherein the identity of the first party is provably bound to the message.

47. The method as described in claim 43 wherein if the predetermined circumstance occurs, the identity of the first party is traced but only with respect to the message.

48. The method as described in claim 43 wherein the trustee makes use of secure hardware.

49. The method as described in claim 43 wherein the second party is an information provider having a database of information and the message includes a request to retrieve information from the database.

50. The method as described in claim 49 further comprising having the second party provide a reply to the message.

51. The method as described in claim 50 wherein the reply includes at least the information requested by the first party.

52. The method as described in claim 51 wherein an open communication connection is maintained between the first party and the second party, through at least one trustee, while the message is communicated.

53. The method as described in claim 52 wherein the open communication connection is maintained at least until the reply is sent from the second party.

54. The method as described in claim 53 wherein the reply travels backwards along the open communication connection.

55. The method as described in claim 53 wherein the communication occurs in a computer network and the open communication connection is a sequence of open computer connections.

56. The method as described in claim 55 wherein the first party is billed for a period of time during which the communication connection is open.

57. The method as described in claim 55 wherein the first party is billed via the open communication connection.

58. The method as described in claim 57 wherein the second party is an information provider and the reply is information retrieved from a database.

59. The method as described in claim 50 wherein the reply is guaranteed to be traceable to the message by at least one trustee.

60. The method as described in claim 43 wherein the second party is an auctioneer and the message is a bid.

61. The method as described in claim 60 wherein the first party is a successful bidder and the predetermined circumstance is an auction award.

62. A method for providing an electronic auction involving an auctioneer and at least first and second bidders, comprising:
having each of the bidders communicate bidding information to the auctioneer in an anonymous manner with the assistance of at least one trustee, wherein the auctioneer uses the bidding information to conduct the electronic auction; and
having the trustee contribute action to trace the identity of at least one of the bidders upon completion of the electronic auction.

63. The method as described in claim 62 wherein the trustee does not trace the identity of the other bidder.

64. The method as described in claim 62 wherein the bidder whose identity is traced by the trustee is the winning bidder.

65. A method of communicating between a first party and a second party with the assistance of at least one trustee, wherein the second party does not know the identity of the first party, comprising:

maintaining an open communications connection between the first and second parties through the at least one trustee during at least the transmission of a message; and having the trustee contribute action to trace the first party's identity under a predetermined circumstance.

66. The method as described in claim 65 wherein the open communication connection is maintained when a reply to the message is sent from the second party.

67. The method as described in claim 66 wherein the reply travels backwards along the open communication connection.

68. The method as described in claim 66 wherein the communication occurs in a computer network and the open communication connection is a sequence of open computer connections.

69. The method as described in claim 66 wherein the first party is billed for a period of time during which the communication connection is open.

70. The method as described in claim 66 wherein the first party is billed for the reply via the open communication connection.

71. The method as described in claim 70 wherein the second party is an information provider and the reply is information retrieved from a database.

72. A method of communication between a first party and a second party with the assistance of at least one trustee, comprising:

establishing an open communication connection between the first party and the second party via the at least one trustee; and having the first and second parties exchange messages and replies forwards and backwards over the open communication connection without revealing the first party's identity to the second party unless a predetermined circumstance occurs.

73. A method of communication between a first party and a second party with the assistance of at least one trustee, comprising:

establishing an open communication connection between the first party and the second party via the at least one trustee; and having the first and second parties exchange messages and replies forwards and backwards over the open communication connection without proving the first party's identity to the second party unless a predetermined circumstance occurs, and wherein the second party does not know a priori the content of the messages of the first party.

74. The method as described in claim 72 or 73 wherein there are at least first and second trustees, wherein at least the first trustee does not know the identity of the second party and at least the second trustee does not know the identity of the first party.

75. The method as described in claim 74 wherein at least one of the two trustees contributes action to trace the first party's identity when the predetermined circumstance occurs.

76. The method as described in claim 74 wherein the second party is an information provider and at least one trustee contributes action to bill the first party.

\* \* \* \* \*